United States Patent Office.

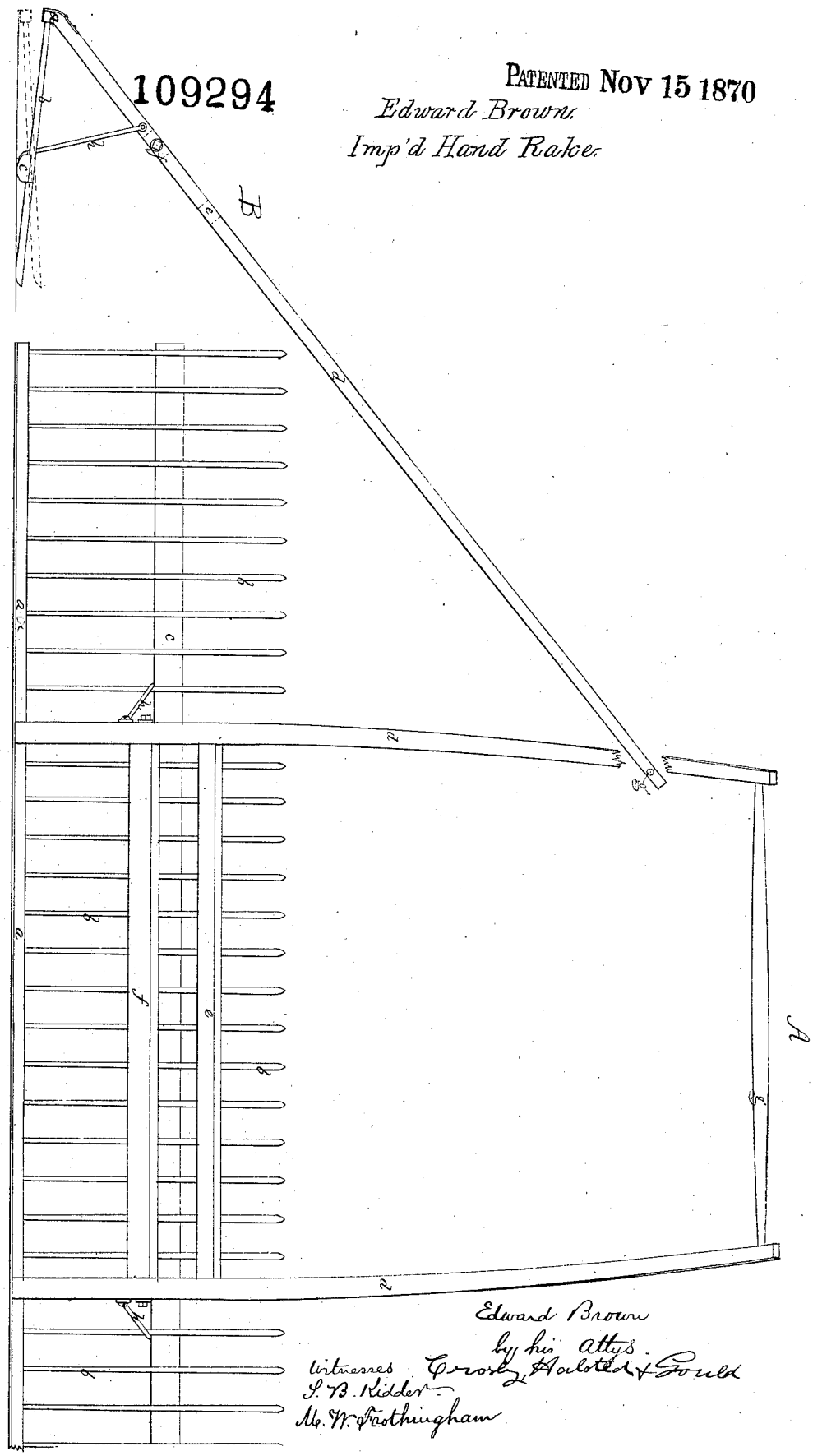

EDWARD BROWN, OF KENNEBUNK, MAINE.

Letters Patent No. 109,294, dated November 15, 1870.

IMPROVEMENT IN HAND-DRAG RAKES.

The Schedule referred to in these Letters Patent and making part of the same.

*To all whom it may concern:*

Be it known that I, EDWARD BROWN, of Kennebunk, in the county of York and State of Maine, have invented an Improved Rake; and I do hereby declare that the following, taken in connection with the drawing which accompanies and forms part of this specification, is a description of my invention sufficient to enable those skilled in the art to practice it.

My invention relates to an improvement in hand-drag rakes, and consists in affixing a shoe or fulcrum-piece to the under side of the teeth, at a point somewhere about midway between the head and the points or tips of the teeth.

In carrying out my invention I use a long head, square in section, and insert in its front face the butts of a series of long wooden teeth, under which, about midway between the head and the points of the teeth, or somewhat nearer the teeth-points, I place a shoe or fender-bar, upon which bar the teeth rest, by which they are braced, and upon which they can tip as a fulcrum, the tooth-frame thus made lying upon the ground, and having fixed to its head, and extending from it at an angle of about forty-five degrees, a pair of handles or shafts, (which are secured to the shoe by suitable tie-rods or struts,) the operator standing within these shafts and drawing against a cross-bar uniting the front ends of the shafts.

It is in this construction that my invention consists.

The drawing shows a rake embodying the improvement.

A shows the rake in plan.

B is an end elevation of it.

*a* denotes the head, preferably about eight feet long and an inch and a half square, in cross-section.

Into the front face of this head are inserted the butts of the teeth *b*, each tooth being half-inch square in section, and twenty inches long.

About midway between the head *a* and the points of the teeth (or as shown in the drawing) I place the shoe or fender or fulcrum-bar *c*, extending under all the teeth, which are fixed to it preferably by mortising the shoe to receive them.

The shafts *d*, bolted to the head, extend up from the rake-frame at an angle of about forty-five degrees therefrom, the shafts being preferably about six feet long, and having cross-bars or stretchers *e f*, uniting them near the rake-frame, and a draft-bar, *g*, uniting them at their front ends, as seen at A.

The shafts are rigidly retained at their angle relative to the rake-frame, by tie or strut-rods *h*, stretching from the shafts to the shoe and bracing the whole series of teeth.

In using the implement, the raker stands within the shafts and pushes against the front bar *g*, the rake-frame lying upon the ground with the points of the teeth inclined downward, as seen at B. Now although the rake is quite wide and the teeth long and slender, it will be obvious that they cannot spring unduly nor fail to operate, while the lightness of the whole rake enables it to be operated with great ease, and to rake very fast and efficiently.

When the rake strikes any obstruction, the operator raises the handle slightly, tipping the rake-teeth on the shoe *c*, (which projects below them, as seen at B,) the teeth-points being thereby elevated, as seen by the dotted lines at B.

The shoe thus answers as a guard to keep the teeth in proper position just above the ground in raking, as a fulcrum to enable the teeth-points to be tipped up to clear obstructions, and as a brace to rigidify the frame and give stability to the teeth.

The dimensions given above may, of course, all be varied, though I prefer to construct the rake substantially in accordance with them.

The head *a*, teeth *b*, and shafts *d*, with their cross-bars, I prefer to make of white ash, and the shoe of pine, but other suitable woods may be employed.

I claim—

A hand-rake, having a head, *a*, in which are inserted teeth *b*, which rest upon and are fixed to a shoe or fulcrum *c*, located about midway between the head and the points of the teeth, the rake-frame having shafts bolted or rigidly connected to the head and to the shoe *c*, all substantially as shown and described.

EDWARD BROWN.

Witnesses:
SAML. CLARK,
JAMES A. FAIRFIELD.